July 8, 1941.   J. J. TOROK   2,248,444
VARIABLE RATIO MECHANICAL DRIVE MECHANISM
Filed May 16, 1939   2 Sheets-Sheet 1
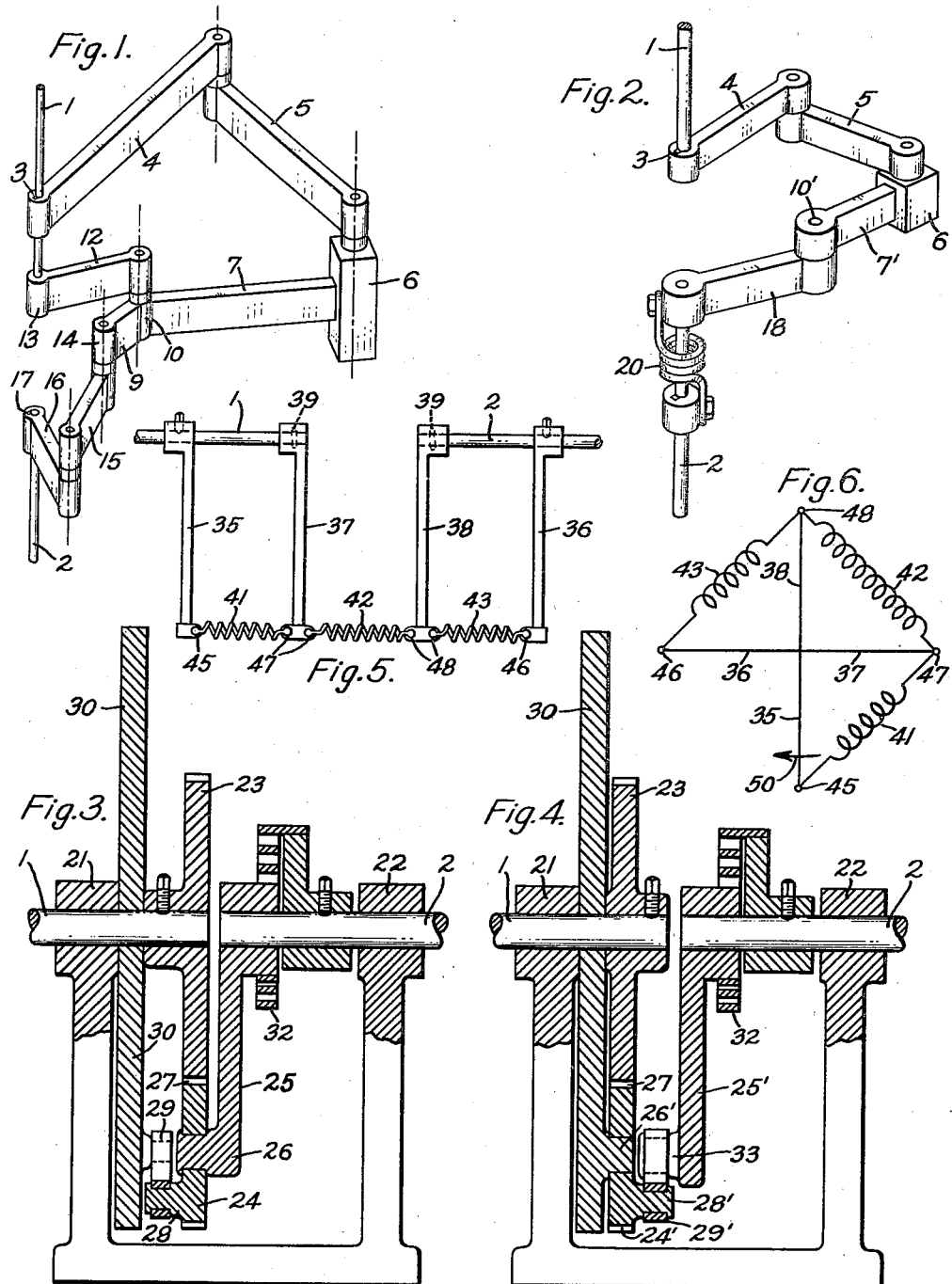
WITNESS
INVENTOR
Julius J. Torok.
BY
ATTORNEY

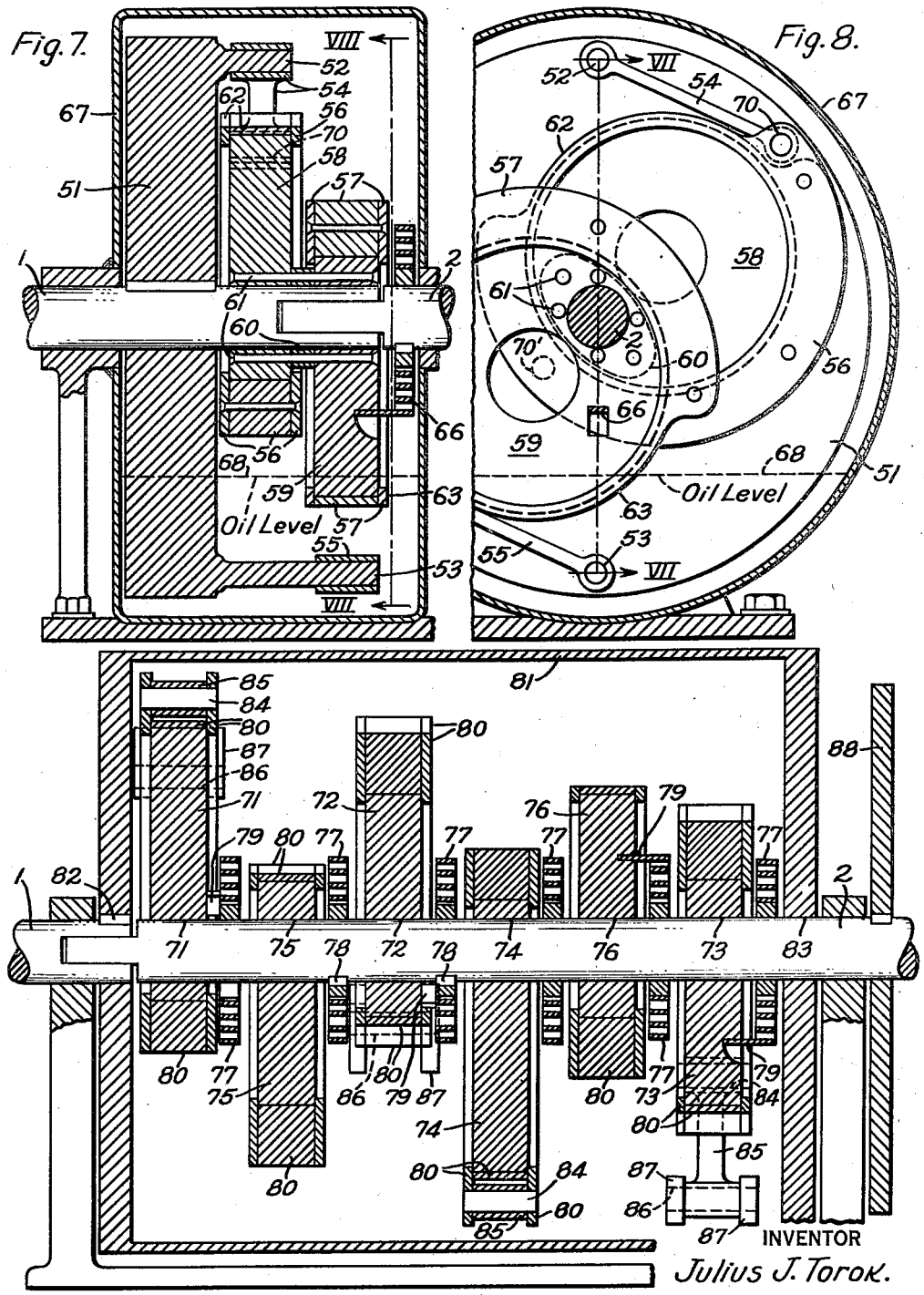

Patented July 8, 1941

2,248,444

UNITED STATES PATENT OFFICE 2,248,444

VARIABLE RATIO MECHANICAL DRIVE MECHANISM

Julius J. Torok, Corning, N. Y.

Application May 16, 1939, Serial No. 273,904

27 Claims. (Cl. 74—64)

My invention relates to variable-ratio mechanical drive-mechanisms for transmitting power from a movable driving member to a movable driven member, and it has more particular relation to such drive-mechanisms for transmitting variable torque from a driving shaft to a coaxial driven shaft.

The better types of mechanical drives have heretofore been of an essentially fixed speed-ratio, requiring the addition of auxiliary make-shift devices, such as gear-shift mechanisms, to obtain a variable ratio. To transform large blocks of power at variable ratios, it has commonly been necessary to resort to electrical drives which are costly, heavy, complicated, and not as efficient as might be desired. Some variable-ratio, all-mechanical drives are known, in the low-energy class, but they are subject to various limitations, such as overheating from friction, short life, limited power-possibilities and high cost. Various types of variable-ratio mechanical drives have been proposed, utilizing or developing cyclically reversing movements or forces, in combination with a mechanical rectifier or over-running clutch mechanism, but to date there has not been produced a mechanical rectifier, for transmitting forces in one direction better than in the opposite direction, which will stand up under the constant pounding of a continually reversing force when handling large blocks of power. Such drives, utilizing mechanical rectifiers, have not in general been adapted for embodiment in the polyphase design which is vitally necessary, in handling any considerable amount of energy, in order to reduce the vibration resulting from the cyclically reversing forces or movements.

The principal object of my invention is to solve the problems presented by the above-mentioned prior-art devices, and to provide a variable-ratio mechanical drive mechanism which requires no mechanical rectifier, is readily adapted for embodiment in a polyphase form, and is relatively light in weight, durable and inexpensive.

A more specific object of my invention is to provide a variable-ratio mechanical drive mechanism which utilizes a cyclically reversing force in combination with yieldable or variable-motion connection-means for effecting an elongating movement during periods when the driven shaft is being accelerated, so as to increase the time-period of the effectiveness of the accelerating forces as compared to the decelerating forces.

Another object of my invention is to provide a mechanism of the class described, in which the cyclically reversing forces are obtained from the centrifugal forces which are developed in a mass which is given an irregular eccentric movement of continuous revolution about an intermediate point in the drive mechanism.

Another object of my invention is to provide a mechanism of the class described, in which the cyclically reversing forces are obtained from a so-called inertia member which is given a movement having a cyclically reversing component, at an intermediate point in the drive mechanism.

Another object of my invention is to provide a mechanism of the class described, in which the cyclically reversing forces are obtained from a set of rotating arms joined by chordally disposed springs so designed that the springs pull forwardly, on the driven shaft, longer and harder than they pull backwardly.

A still further object of my invention is to provide a variable-ratio mechanical drive mechanism combining units or elements of differing phase, or differing speed-torque characteristics, or both, with yieldable connection-means suitable for enabling all of the units or elements to exert their respective driving torques on a common driven shaft.

With the foregoing and other objects in view, my invention consists in the means, methods, systems, combinations and elements hereinafter described and claimed, and illustrated in the accompanying drawings, wherein:

Fig. 1 is an isometric projection illustrating one form of embodiment of my invention in what I call the centrifugal type, Fig. 2 is a perspective view showing a modified form of the centrifugal type of my invention, Fig. 3 is a vertical cross-sectional view of one form of embodiment of my invention in what I call the inertia type, Fig. 4 is a similar view showing a modified form of the inertia type of my invention, Fig. 5 is a side elevational view of a form of embodiment of my invention in what I call the chordal-spring type, Fig. 6 is a diagrammatic end-view illustrative of the operation of the type of my invention shown in Fig. 5, Fig. 7 is a longitudinal vertical sectional view of a so-called balanced single-element direct-drive inertia-mechanism embodying my invention, the section-plane being indicated by the line VII—VII in Fig. 8, Fig. 8 is a transverse vertical sectional view on the line VIII—VIII of Fig. 7, and Fig. 9 is a longitudinal vertical sectional view of a polyphase embodiment of my invention.

In all of the figures of the drawings, the driving shaft is designated by the numeral 1, and the driven shaft by the numeral 2, and the two shafts 1 and 2 are co-axial or in alinement with each other. In some of the illustrated forms of embodiment, either shaft may be the driver, but for convenience of explanation the shaft 1 will in general be assumed to be driving. For the sake of simplicity in illustration, I have not shown any details of the bearings or the bearinglubricating means, and in general I have not shown the flywheels which would commonly be associated with both the driving shaft 1 and the driven shaft 2, in common with other pulsating-torque power-shafts, as these are features which are well-known to those skilled in the art and are not peculiar to my invention, except that they are used in my invention.

In the particular form of my invention which is illustrated in Fig. 1, the driving shaft 1 has keyed thereto, at 3, a driving arm or crank 4, which is connected, by a pivoted link 5, to a centrifugal mass 6, which is carried at the end of the long arm 7, of a bell-crank lever having also a short arm 9, and an intermediate supporting point 10. The supporting point 10 of the bell crank 7-9 is pivotally mounted on the end of an oscillating arm or link 12, the other end of which may conveniently be mounted on either shaft 1 or 2, preferably on the driving shaft 1 as illustrated at 13.

The short arm 9 of the bell crank in Fig. 1 is disposed at an angle to the long arm 7, the particular angle illustrated being about 138½° although I am not limited to any particular angle. The short arm 9 is shorter than the oscillating link 12, so that the end 14 of said short arm is always clear of the shafts 1 and 2 or any extension thereof, real or imaginary. The end 14 of the short bell-crank arm 9 is joined, by a pivoted link 15, to the end of a driven arm or crank 16 which is keyed at 17 to the driven shaft 2.

The operation of the centrifugal-type, variable-speed drive-mechanism shown in Fig. 1 is as follows. Let it be assumed, for the moment, that the driven shaft 2 is stationary, and that the driving shaft 1 is rotating at a constant angular velocity. The driving crank 4 is thus rotating, while the driven crank 16 is stationary, but the two cranks are joined, through the links 5 and 15, to the two ends of a rigid bell crank lever 7-9, the intermediate point 10 of which is constrained to oscillate in an arc prescribed by the oscillating arm 12, as the driving crank 4 rotates relatively to the driven crank 16. The oscillating arm 12 is short as compared to the length of the driving crank 4, and it oscillates, at varying angular velocities, through a limited arc, back and forth, as the connecting link 5 causes the mass 6 to revolve around the movable point 10 at the end of the oscillating arm 12. It is to be understood that the mechanism, including the driving crank 4 and the link 5, is symbolic of any equivalent driving mechanism for imparting a motion of revolution to the mass 6 from the movement of the driving shaft 1.

A step-by-step plotting of the motions of the centrifugal mass 6 and of the intermediate point 10 of the mechanism shown in Fig. 1 shows that both motions are irregular, with varying speeds at different points in the rotation of the steadily moving driving crank 4. The centrifugal force developed in the mass 6 causes the short end 14 of the bell crank to react, with alternating thrust and pull, on the link 15 which is pivoted to the assumedly stationary crank 16 of the shaft 2 which is to be driven. The step-by-step analysis, supported by actual tests, shows that the oscillatory movement of the intermediate point 10 is a yielding movement during a material portion of the time when the bell-crank end 14 is pulling on the driven-shaft crank 16, in a direction tending to accelerate the latter, or to cause it to rotate in the same direction as the driving crank 4, thus prolonging the time when an accelerating force is operating on the driven shaft 2. In like manner, the irregular movement of the intermediate point 10 causes a shortening of the time during which a decelerating force is operating on the driven crank, by reaction resulting from the revolution of the mass 6 about the intermediate point 10. These accelerating and decelerating forces, while variable and not quite equal, are nevertheless near enough equal so that the product of force, or turning-moment, times time, integrated in the accelerating direction, is greater than a similar product in the decelerating direction, resulting in a preponderant overall torque or turning-moment on the driven shaft 2.

If the intermediate point 10, about which the centrifugal mass 6 revolves, were stationary, with the link 15 connected directly to the intermediate point 10, the effectiveness of the accelerating force on the driven crank 16 would be exactly offset by an equal reaction in the decelerating direction, so that the resultant overall torque on the driven shaft would be zero. An essential feature which makes my centrifugal-type drive-mechanism operative, as illustrated in Fig. 1, is the provision of some means for causing the intermediate point 10 to yield, or to be displaced, in the direction in which the accelerating force is pulling, during the time when said accelerating force is operating, thus lengthening the accelerative periods and shortening the decelerative periods, or making the accelerative periods more effective and the decelerative periods less effective.

The foregoing explanation of the operation of the centrifugal type of drive-mechanism has assumed that the driven shaft is stationary and that the driving shaft is rotating, and I have shown that this type of drive-mechanism produces a preponderantly positive starting-torque on the driven-shaft 2, tending to accelerate the latter in the direction of rotation of the driving shaft 1. This starting-torque is obviously proportional to the square of the speed of the driving shaft, since the centrifugal force developed by the revolving mass 6 is proportional to the square of its speed. Hence the driving shaft 1 has to be rotated at a fairly high speed, in order to develop a good starting-torque in the driven shaft 2.

It will be noted that the centrifugal forces developed by the mass 6 in Fig. 1 are dependent, almost altogether, upon the speed of the driving shaft 1, relatively independently of the speed of the driven shaft 2. This is true because the speed of rotation of the eccentric mass 6, and hence its centrifugal force, is determined by the speed of the driving crank 4, since the link 5 causes the weight 6 to travel around with the driving crank. Tests show that when the driven shaft 2 starts to move, in a centrifugal-type driving-mechanism embodying my invention, the effective accelerating or driving torque on the driven shaft is maintained, or even increased, particularly if the driving shaft is accelerated. This effective driving torque is maintained, even at the synchronous speed of the driven shaft, that is, when the two shafts are operating at the same speed, particularly at high synchronous speeds when the weight 6 is revolving very rapidly.

Fig. 2 illustrates another form of embodiment of a centrifugal-type driving-mechanism, in which the driving crank 4, with its link 5 and connected mass 6, are the same as in Fig. 1. The mass-supporting arm 7 of Fig. 1 is here replaced by an arm 7' of similar length, and the arm 7' in Fig. 2 is rotatably supported at an intermediate point 10' of the drive-mechanism. The intermediate point 10' in Fig. 2 is carried by the end of a yieldably mounted arm 18 which is pivoted on the driven shaft 2 and is connected thereto through a yieldable torque-transmitting connection such as a coil-spring 20. It is to be understood that the coil-spring coupling 20 is symbolic of any equivalent yieldable torque-transmitting connection between the intermediate point 10 and the driven shaft 2.

In Fig. 2, the means for causing the intermediate point 10 to yield in the direction of the accelerating forces is the spring-connection 20, instead of the bell-crank combination shown in Fig. 1. Otherwise the operation in Fig. 2 is the same as in Fig. 1, and the resultant effective torques are very similar, in the two cases, provided that the angle of the spring-deflection, in Fig. 2, is of the same order of magnitude as the angle of oscillation of the oscillating arm 12 in Fig. 1. Obviously, the stiffness of the spring 20 in Fig. 2 must be properly chosen, with reference to the forces developed, so that the spring-yield will be small, yet sufficient to produce a preponderance of effectiveness of the accelerating forces over the decelerating forces.

In Fig. 3, I have illustrated what I call an inertia type of drive embodying my invention. The co-axial driving and driven shafts 1 and 2 are illustrated as being journaled in bearings 21 and 22. The driving shaft 1 drives a sun-gear 23 of an epicyclic train including a planetary gear 24. The planetary gear 24 is so supported, as by an arm 25, that the planetary gear has a motion compounded of rotation about its own axis 26 and revolution of its axis 26 about the axis 1 of the sun gear 23. It will be obvious that the planetary wheel 24 may either rotate about the outer circumference of an externally meshed sun wheel 23, as shown in Fig. 3, or it may rotate about the inner circumference of an equivalent internal sun gear, the illustrated mechanism being symbolic of any epicyclic train in which a planetary wheel 24 is constrained to move in the compound motion previously described. It is to be further understood that the specific nature of the gear teeth 27, or other driving connection, between the two wheels is subject to wide variation in choice, and forms no part of my present invention except that some such means is broadly shown in Fig. 3.

In Fig. 3, the planetary gear 24 has a crank-pin 28 which is connected, through a pivoted connecting-link 29, to what I term an inertia mass 30, which is illustrated in the form of a disc or wheel which is freely journaled one one of the shafts 1 or 2, for example the driving shaft 1, so as to have a back-and-forth or oscillatory movement on the shaft 1, or a movement compounded of a rotating component and a reversible oscillatory component. The axis 26 of the planetary gear 24 is carried by the arm 25 which is pivoted on the driven shaft 2 and is yieldably coupled thereto through a spring-drive 32 or equivalent yieldable coupling means.

The operation of the inertia drive shown in Fig. 3 will first be described with the assumption that the driven shaft 2 is stationary. When the driving shaft 1, rotates, the sun wheel 23 causes the planetary wheel 24 to rotate, assuming that the axis 26 of the latter is held stationary or restricted to only a limited back-and-forth oscillatory movement by the stationary driven shaft 2 and the spring-coupling 32. As the planetary gear 24 rotates about its axis 26, its crank-pin 28 causes the inertia wheel 30 to oscillate back and forth, causing accelerating and decelerating reactions on the spring-coupled pivoted arm 25 which carries the planetary gear. The yielding of the spring 32, when the arm 25 is exerting a turning-movement tending to accelerate the driven shaft 2, or to cause it to turn in the same direction as the driving shaft 1, results in a greater effectiveness of the eccelerating torque on the driven shaft 2, than the opposite or decelerating force.

The phenomena just described, in connection with the operation of the inertia drive-mechanism shown in Fig. 3, will perhaps best be explained by reference to the mechanical advantages, or what amounts to the leverages, of the various forces involved. When the crank-pin 28 of the planetary gear 24 is closest to the sun gear 23, or 180° opposite to its position shown in Fig. 3, and if it be assumed, for the moment, that the crank-pin 28 is in line with the gear-teeth 27, or on the same radius as the teeth, then it will be evident that the sun gear 23 will be directly pushing against the inertia wheel 30, driving the inertia wheel at the same speed as the driven shaft, through the gear-teeth 27 and the (assumedly) alined crank-pin 28 and link 29. Under these circumstances, there would be no reaction, either positive or negative, on the gear-axis 26 which is carried by the arm 25 which is, in turn, resiliently coupled to the driven shaft 2. Even with the crank-pin 28 on a radius less than the teeth 27 of the planetary gear 24, as shown in Fig. 3, the mechanical advantage of the inertia-reaction of the mass 30, relative to the torque exerted at 26 on the driven axis 2, is very poor, necessarily less than 1.

When the planetary gear 24 has rotated, through 180°, to the position shown in Fig. 3, still assuming that the gear-axis 26 is stationary except for the yielding of the spring 32, it will be observed that the crank-pin 28 of the planetary gear is moving, or trying to move, at its maximum speed backwards, or in a direction opposite to the direction of rotation of the driving gear 23. This hard pulling-back on the inertia-wheel 30 occurs at a time when the inertia-reaction exerted on the crank-pin 28 is at a good mechanical advantage relative to the gear-axis 26, this mechanical advantage being necessarily greater than 1 and approaching 2 as a limit when the crank-pin 28 is in alinement with the gear-teeth 27. This mechanical advantage can be considered as if the planetary gear 24 were a lever, one end of which is fulcrumed on the meshing teeth of the sun gear 23, the other end being pressed upon by the inertia-reaction of the inertia-wheel 30, and an intermediate point (the gear-axis 26) exerting an accelerating force on the driven shaft, tending to cause the driven shaft to turn in the same direction as the driving shaft 1. The yielding of the spring 32 in the direction of application of the force thereon, coupled with the shifting mechanical advantages as above described, causes the inertia type of drive, as exemplified in Fig. 3, to have an accelerating component at a good mechanical advantage, and a decelerating component at a poor mechanical advantage, so that the overall result is a very good starting-torque.

When the driven shaft starts to rotate, in Fig. 3, the spring-coupled arm 25 starts to rotate in the same direction as the sun-gear 23, thus reducing the rate of rotation of the planetary gear 24, for a given rate of rotation of the sungear. Since the inertia-reaction of the oscillatory inertia-wheel 30 depends upon the rapidity of its back-and-forth oscillation, and hence upon the speed of rotation of the planetary wheel 24 on its axis 26, the driving torque of the drivemechanism begins to fall off. If the driven shaft 2 should rotate synchronously with the driving shaft 1, there would be no rotation of the planetary wheel, and no oscillation of the inertia-wheel 30, and hence no driving torque on the driven shaft. Long before synchronism could be reached, the driven shaft 2 of Fig. 3 would have a rather poor torque, a high torque being obtained only by maintaining (within limits) a high difference between the rates of speed of the driving and driven shafts.

However, at an extremely high speed-difference between the driving and driven shafts, in the inertia type of drive shown in Fig. 3, a critical speed-condition is reached, when the system approaches the fundamental period of oscillation or resonance of the mass 30 and the spring 32. At this speed, there occur harmonic or sinusoidal oscillatory forces which completely override the unidirectional force effects, changing the timing of the gear-supporting arm 25 so that no resultant or effective force is exerted on the driven axis. In other words, as in the centrifugal drive, the stiffness of the spring must be properly chosen for the forces and angular displacements which are required or obtained, in order to obtain the unidirectional effective driving torque when the torques are integrated over a complete cycle. This torque-limiting characteristic, due to resonance-conditions at excessive drive-shaft speeds, may be utilized to advantage to prevent the transmission of excessive torques by the drive-mechanism.

In Fig. 4, I have shown a variation in the Fig. 3 structure, in which the axis 26' of the planetary gear 24' is carried by the inertia-wheel 30', and the crank-pin 28' of said planetary gear is connected, through a pivoted link 29', to a pin 33 carried by the spring-coupled arm 25' which is, in turn, carried by the driven shaft 2. Otherwise, the construction in Fig. 4 is similar to that in Fig. 3.

Again assuming, for the moment, that the driven shaft 2 is stationary, and that the driving shaft 1 is rotating, the drive-mechanism shown in Fig. 4 will operate somewhat as follows. When the crank-pin 28' of the planetary gear 24' is closest to the point where the teeth 27 of the two gears mesh, or 180° from the planetary-gear position illustrated in Fig. 4, said crankpin 28' will be almost in alinement with the gear teeth 27 of the sun-wheel 23, so that the sunwheel will be driving the arm 25' forwardly, through the link-coupling 29', causing said arm 25' to move forwardly, momentarily, at practically the same speed as the sun-wheel 23. This movement sets up a strong tension in the spring 32, tending strongly to accelerate the driven shaft 2, or to cause the driven shaft to rotate in the same direction as the sun-wheel 23. Furthermore, because the crank-pin 28' is closer to the periphery of the planetary gear 24' than to the axis 26' of the planetary gear, the inertia-reaction of the inertia-wheel 30' on said axis will be at a poor mechanical advantage, at this time, having relatively little effect upon the aforesaid setting-up of an accelerating spring-tension in the spring 32.

When the planetary wheel 24' has moved through 180°, or to the position shown in Fig. 4, still assuming the crank-pin 28' to be stationary except for the limited movement permitted by the spring 32, the gear-axis 26', and hence the inertia-mass 30', must be moving forward, at this moment, at something like half the speed of the sun-gear 23, more or less, being accelerated by the sun-gear. The backward reaction of the inertia-mass, pushing back on the gear-axis 26' in a direction contrary to the direction of rotation of the sun-gear 23, has a poor mechanical advantage or leverage on the connecting link 29' which is connected to the arm 25', so that the decelerating force on the arm 25' is not as great as the almost direct action of the sun-gear 23 during the accelerating part of the cycle. The yielding of the spring 32 during the accelerating period thus lengthens the accelerating action, which operates favorable, to strengthen the accelerating action, in combination with the relatively strong mechanical advantage of the sungear during the accelerating period as compared with the relatively poor mechanical advantage of the inertia-reaction of the inertia-wheel 30' during the decelerating period.

The starting characteristics of the inertia-type drive shown in Fig. 4 are thus similar to the starting characteristics of the drive shown in Fig. 3. A little reflection will show that the running-torque characteristics of the two gears of Figs. 3 and 4 will be similar, when the driven shaft 2 is rotating.

In Fig. 5, I show a third type of my variable-ratio mechanical drive-mechanism, which I designate as the chordal-spring drive. In this mechanism, the driving shaft 1 and the co-axial driven shaft 2 are provided with keyed crank-arms 35 and 36, respectively; and between these two keyed crank-arms there are provided one or two intermediate, loosely pivoted arms 37 and 38 which are pivoted on the common axis of the two shafts 1 and 2. The intermediate free arm or arms 37 and 38, while free to rotate, will, in general, be restrained against longitudinal movement, as by means of thrust-bearings such as ball bearings 39 or any equivalent means. The ends of the crank-arms 35 and 36 and of the intermediate free arm or arms 37 and 38 are joined, in successive pairs, by a plurality of springs 41, 42 and 43, which are preferably attached to their respective arms by universal joints such as ball-and-socket joints 45, 47, 48 and 46 on the respective arms 35, 37, 38 and 36.

The operation of the chordal-spring drive-mechanism shown in Fig. 5 will best be understood by reference to the diagrammatic endview in Fig. 6, where it has been assumed that the arms 35, 36, 37 and 38 have been moved, from their position of rest which is shown in Fig. 5, to a critical position which is shown in Fig. 6. In Fig. 6, it has been assumed that the driving arm 35 is 270° in advance of the driven arm 36, the direction of rotation being indicated by the arrow 50. The two freely swinging intermediate arms 38 and 37 are shown as being positioned, respectively, less than 90° and more than 180° in advance of the driven arm 36. Hence the springs 41 and 43 subtend the chords of arcs less than 90°, while the spring 42 subtends the chord of an arc greater than 90°.

A calculation of the turning-moments exerted by the several springs 41, 42 and 43 on the arms to which they are connected will show that the turning moment from 0° to an arc θ equal to 90° increases approximately according to the function (1—cos θ), under somewhat idealized assumptions; while the turning-moment from 90° to 180° decreases approximately according to sin θ. This means that, as the arc θ increases and approaches 90°, the turning-moment of the corresponding spring will be increasing rapidly, while as the arc θ increases and begins to exceed 90°, the turning-moment of the corresponding spring will be decreasing very slowly.

Reference to Figs. 5 and 6 will show that the intermediate spring 42 has more turns, or is otherwise designed, so as to have greater yieldability than the other two springs. The arm 37 is carried by the driving shaft 1, as shown in Fig. 5, and the arm 38 is carried by the driven shaft 2, there being a free, open space between the ends of the two shafts between these arms. Since the intermediate spring 42 is more flexible, it passes the 90° position sooner than the two other springs, as the driving crank 35 pulls ahead of the driven crank 36, as illustrated in Fig. 6.

In this position, as shown in Fig. 6, the two end-springs 41 and 43 have ceased to extend any further, as the driving arm 35 continues to swing around further ahead of the driven arm 36, because the turning-moment of the intermediate spring 42, being in the 90° to 180° range, is decreasing as the arc subtended by the intermediate spring increases, meaning that there must be a decrease in the arcs subtended by the two end-springs 41 and 43 which are in their 0° to 90° range. This action continues, with the spring 42 stretching more and more, and with the springs 41 and 43 stretching less and less, but still with the arms in stable equilibrium, until a point is reached at which the rate of decrease of the turning-moment of the intermediate spring 42, on increasing subtended arcs at its point of operation, is greater than the rate of increase of the turning-moment of either one of the end-springs 41 or 43, on increasing subtended arcs at its point of operation.

When this point is reached, the driving arm 35 will have moved further (more than 270°) in advance of the driven arm 36, further than is shown in Fig. 6, the intermediate spring 42 will be stretched over a larger arc than is shown in Fig. 6, and the two end-springs 41 and 43 will be contracted to a smaller arc than in the illustrated positions in Fig. 6. Any movement beyond this last-mentioned critical point will cause the turning-moments of the two end-springs 41 and 43 on the intermediate arms 37 and 38 to fall off less rapidly, on decreasing arcs, than the turning-moment of the intermediate spring 42 on increasing arcs, and the intermediate spring 42 will then pull on around past 180°, moving from 180° quickly through 270° to 0° or 360°, after which it will pull ahead again, repeating the cycle. Meanwhile, the two end-springs 41 and 43 will have drawn back to their starting position with zero subtended arcs.

It will be noted that the spring 43 will be pulling forwardly, or with an accelerating turning-moment or torque, on the driven crank 36, at all times except when the arm 38 swings back behind the crank 36, which occurs during the rapid movement of arm 37 after it gets more than 180° ahead of the arm 38. Hence, the yielding of the spring-drive, in the direction of the accelerating forces, brings about a positive, or accelerating, driving-force on the driven arm 36 during almost all of the cycle, while the time of application and the effectiveness of the decelerating force is very small.

It will be noted that the end-springs 41 and 43 cannot rotate through 360° because the shafts 1 and 2 would be in the way. Hence it was necessary to see to it that it was the intermediate spring 42 which rotated on around, as was done by giving it a greater flexibility. Also, since the end-springs 41 and 43 do not rotate, they can obviously be replaced by other forms of yielding connections such as the springs 20 and 32 of Figs. 2 and 3.

While I have explained the operation of Figs. 5 and 6 on the assumption of arms of equal length, and two end-springs 41 and 43 both of the same strength or flexibility, it will be obvious that neither one of these assumptions is obligatory. In fact, one of the end-springs 41 or 43 could be stiffened up to the point of zero deformability, which is equivalent to saying that its two arms between which it is connected, could be one and the same arm.

In all of the forms of embodiment of my invention, many changes can be made, without departing from the essential ideas of the invention. All of my illustrations have been drawn more with a view to explaining principles than illustrating details such as the details of the various equivalent or substitutible coupling means or motion-transmitting means, incidental inertia-means such as the inertias of various intermediate moving arms and gears, bearings, stop-means or movement-limiting means, vibration-damping means, and the like, all of which will be obvious to, and within the skill of, the skilled mechanic.

Furthermore, while I have heretofore described only single-phase embodiments of my invention, corresponding to a one-cylinder engine, it will be obvious that each of my single-phase embodiments is capable of delivering torque, from a driving shaft which has a constant angular velocity throughout all of each cycle, to a driven shaft having a constant angular velocity throughout all of each cycle. In other words, I have provided a yielding movement at some intermediate point of each driving-mechanism, so that an accelerating torque which is more effective than the decelerating torque can be applied to the driven shaft without requiring any variation of the relative phase of the driven shaft from time to time during different portions of the cycle. On the contrary, the movement of the intermediate point or points is dependent upon the instantaneous phase-angle between the driving and driven shafts, as well as upon their speeds when they are rotating at different speeds.

As a consequence of the foregoing, my various single-phase drives may be combined, either in what I call polyphase elements of the same type, such as two, three, four, six or more single-phase elements all alike but displaced in time-phase so as to deliver more smoothly-flowing power (with the pulsations overlapping), with less vibration, or in combinations of two or more drive-mechanisms of different types to produce different speed-torque characteristics. Thus, by using two kinds of drives, both delivering torque to the same driven shaft, a combined mechanism can be produced, having the good synchronous-speed torque of the centrifugal drive and the good starting torque of the inertia drive.

I wish my illustrations to be understood with these substitutions and combinations in mind.

Some of the foregoing principles are illustrated in the embodiments of my invention shown in Figs. 7 to 9.

In Figs. 7 and 8, I show a drive-mechanism of the inertia-type, utilizing what I call a direct drive, that is, a drive which does not involve planetary gears. This embodiment of my invention also embodies a balanced design, in a single element or drive-connection, as will now be described.

As shown in Figs. 7 and 8, a flywheel 51, keyed to the driving shaft 1, serves as a pair of diametrically opposed crank-arms for supporting two diametrically opposite crank-pins 52 and 53, which are respectively connected, by link-members 54 and 55, respectively, to two annular members 56 and 57 which serve a dual purpose, as both inertia members and centrifugal weight members, as will be subsequently explained.

The two annular members 56 and 57 are each mounted for circular movement around the circular periphery of a circular wheel 58 or 59, respectively, and said wheels are, in turn, eccentrically journaled on either the driving shaft 1 or on the co-axial driven shaft 2. The two wheels 58 and 59 are spaced apart by a hub-like spacer-member 60 surrounding the shaft, and the three parts 58, 59 and 60 are rigidly joined together, as by bolts or rivets 61, with the two wheels 58 and 59 extending eccentrically out from the shaft, in 180° phase-relationship to each other.

Each of the annular members 56 and 57 is of reduced radial extent, beyond the periphery of its associated wheel, on one side, as indicated at 62 and 63, respectively, so that the annular members will have a center of inertia which is displaced from the center of the wheel and to one side of the radial line, which constitutes, in effect, a crank-arm, joining the center of the wheel with the center or axis of the driving-shaft 1.

The unit comprising the two eccentrically mounted circular wheels 58 and 59, and the spacer-hub 60 are yieldably coupled to the driven shaft 2 by means of a coupling-spring 66 which is keyed, at its hub, to the shaft 2.

The whole assembly, as shown in Fig. 7, may be enclosed in a housing 67 which may contain oil 68 in the lower portion thereof.

The operation of the mechanical drive connection shown in Figs. 7 and 8 is twofold, partaking of the nature of both an inertia drive and a centrifugal drive. When the driving shaft 1 is rotating faster than the driven shaft 2, whether the latter is stationary or not, each link 54 and 55 causes its associated annular member 56 or 57 to rotate around its eccentrically mounted circular wheel 58 or 59, and because of the eccentric mounting of the wheel, the rotational movements of the annular members 56 and 57 is irregular, accelerating and retarding, while the shaft 1 rotates at uniform angular velocity. This irregular movement, compounded of a reversing movement-component superimposed on a uniform-velocity circular movement-component of each annular member 56 and 57, is brought about by reason of the fact that the connecting-links 54 and 55 dip in, closer to the axis of the co-axial shafts 1 and 2, when the connecting-pintle 70, which connects the link to the annular member, moves around from the position furthest away from the shaft-axis, as illustrated in Fig. 8, to the dotted-line position 70' closest to the shaft-axis, thus changing the angle of the link 54 or 55 with respect to its associated annular member 56 or 57.

The reversing component of the movement of the annular members 56 and 57 in Figs. 7 and 8 produces inertia-reactions, as in Figs. 3 and 4, while the yielding of the spring 66 causes the driving-torque on the driven shaft 2 to predominate over the retarding-torque, as explained for Fig. 3, with the difference that, in Fig. 8, the thrust or pull of the connecting links 54 and 55 is reflected, in the eccentrically mounted wheels 58 and 59, as a turning-moment on a crank-arm extending from the center or axis of the shaft 2 to the center of the circular wheel 58 or 59, as the case may be. This so-called "inertia" torque is transmitted to the driven shaft 2 whenever the driving shaft 1 is rotating faster than the driven shaft 2, and its effective value is dependent upon the difference between the speeds of the two shafts.

The rotating component of the movement of the annular members 56 and 57 in Figs. 7 and 8 produces centrifugal forces, as in Figs. 1 and 2, by reason of the fact that the effective center of inertia of each of the annular members 56 and 57 is displaced to one side of the effective crank-arms of the corresponding eccentric wheels 58 or 59, that is, the imaginary line between the center of the shaft 1 or 2 and the geometrical center of the eccentric wheel. The yielding of the spring 66 causes the accelerating forces to predominate, as explained for Figs. 1 and 2, and this result is enhanced by the proper choice of the phase-position of the effective center of inertia of the annular members with respect to the attachment-pintles 70 of the driving-links 54, and with respect to the changes in angular velocity produced by the previously mentioned reciprocating movement-component, for any particular design.

The use of a set of two oppositely phased or directed eccentric wheels 58 and 59, each with its own annular member 56 or 57, in Figs. 7 and 8, makes it possible to materially reduce the mechanical vibration produced by the device. Since the torques developed by the two annular members are in phase with each other, it is possible to utilize a single torque-transmitting spring, as shown in Figs. 7 and 8.

In Fig. 9, I show my invention in an exemplary polyphase form, designed to indicate that any of the various forms of my invention may be embodied in a polyphase form in which the time-phases of the alternating or variable components of a plurality of delivered torques, applied to the driven shaft, may be displaced with respect to each other, so as to produce a smoother flow of power, or torque, while at the same time enormously reducing the resultant mechanical vibration of the entire assembly.

The polyphase embodiment of my invention, shown in Fig. 9, makes use of six eccentric wheels 71, 72, 73, 74, 75 and 76, eccentrically journaled on the driven shaft 2 in any desired order of arrangement along the shaft, designed to reduce the overall mechanical vibration. Each eccentric wheel, in Fig. 9, is illustrated as being similar to either one of the two eccentric wheels 58 and 59 of Figs. 7 and 8, although it will be readily understood that double, or "balanced," units might have been utilized, instead of the single units which are illustrated in Fig. 9. The several eccentric wheels 71 to 76 are yieldably coupled to the driven shaft 2 by means of separate spring-couplings 77. These spring-couplings are keyed to the shaft 2 in different phase-positions therearound, as indicated at 78, and they have terminal-ends 79 secured to the respective associated wheels 71 to 76. As in Figs. 7 and 8, each of the eccentric circular wheels 71 to 76 in Fig. 9 is surrounded by an annular member 80, the annular member being similar to the annular members 56 and 57 in Figs. 7 and 8.

In Fig. 9, the six eccentric wheels 71 to 76, with their respective springs 77 and annular members 80, are enclosed in a cylindrical tubular driving-drum 81 which is keyed, at one end 82, to the driving shaft 1, and which is journaled, at the other end 83, on the driven shaft 2. The respective annular members 80 are provided with attachment-pintles 84, which are joined, by connecting-links 85, to what amount to crank-pins 86 carried by brackets 87 which are suitably phased, or disposed at different circumferentially displaced points, said brackets 87 being carried by the inner surface of the cylindrical tubular portion of the drum 81. It should be noted that the phasing of the driving-drum pins 86 is different from the phasing of the spring-keys 78, so as to produce torques in which the pulsations are out of phase with each other. Thus, while the driving-drum pintles 86 may be phased in the order 1—5—2—4—6—3, the corresponding spring-keys may be phased, for example, in the order 1—3—3—1—5—5, producing six-phase torque-pulsations.

The driven shaft 2 in Fig. 9, in common with all of the driven shafts driven by my invention, is provided with a torque-smoothing flywheel, as indicated at 88. Because of the polyphase torque-production in Fig. 9, this flywheel does not need to be as large as in the single-phase embodiments of my invention, or if as large, it will produce better results in the way of a more nearly smooth angular velocity. The drum 81 acts as a flywheel on the driving shaft 1 in Fig. 9.

The operation of the mechanism shown in Fig. 9 will be clear from the description given in connection with Figs. 7 and 8, noting that the apparatus of Fig. 9 utilizes six single-phase drives, each producing a pulsating torque on the driven shaft 2, but with the torque-pulsations out of phase with each other, so as to smooth out the resultant torque, while at the same time reducing vibration.

From the explanations previously given, it will be evident that the composite drive shown in Fig. 9 will produce polyphase torques all of which contribute their driving-impulses independently of the others, producing a resultant effective torque which is equal to the smoothed-out, integrated sum of all of the individual single-phase or pulsating torques, referring both to the pulsating torques of different time-phases, and to the torques of different speed-torque characteristics, all of which are added together to produce a smooth, integrated sum.

While I have illustrated the principles of my invention in several different forms, it will be obvious, as previously explained, that such illustration is only by way of explanation and not by way of limitation. I desire, therefore, that the appended claims shall be accorded the broadest construction consistent with their language and the prior art.

I claim as my invention:

1. A variable-ratio mechanical drive mechanism for transmitting power from a movable driving member to a movable driven member, comprising a movable intermediate member, a first mechanical drive connection for transmitting energy between the driving member and the intermediate member in such manner that the energy thus transmitted varies cyclically in dependence, in some measure, upon the phase-position of the intermediate member relatively to the driving member, a second mechanical drive connection for alternately imparting accelerative force from the intermediate member to the driven member and imparting decelerative force from the driven member to the intermediate member in dependence, in some measure, upon the phase-position of the intermediate member relatively to the driven member, one of said mechanical drive connections being characterized by a variable-motion connection for causing a yielding movement between the driven member and the intermediate member during the accelerative periods whereby the products of the periods of application and the effectiveness of application of said accelerative force to said driven member are increased, while the products of the periods of application and the effectiveness of application of said decelerative force to said driven member are decreased, and sufficient inertia-means associated with said driven member to absorb said decelerative forces without reversing the motion of said driven member.

2. A variable-ratio mechanical drive mechanism for transmitting power from a movable driving member to a movable driven member, comprising a rotatable flywheel-means mechanically coupled to said driving member for maintaining an angular velocity which does not greatly vary cyclically under the operating conditions of the mechanism, a rotatable flywheel-means mechanically coupled to said driven member for maintaining an angular velocity which does not greatly vary cyclically under the operating conditions of the mechanism, an intermediate movable member of appreciable mass, a mechanical drive connection for so connecting said driving member and said driven member that both of said flywheel-means may rotate at independently variable speeds and that an intermediate point in said mechanical drive connection is given a cyclically-varying motion dependent, in some measure, upon the relative phase-positions of the driving and driven members, said mechanical drive connection being of such nature that it exerts both positive and negative cyclically varying force-reactions upon both the driving member and the driven member in dependence upon cyclically varying force-reactions which are imparted to said mechanical drive connection at said intermediate point, said mechanical drive connection including mechanical coupling means for utilizing the inertia of said intermediate movable member for imparting the cyclically varying force-reactions to said intermediate point in conformity with the cyclically varying motion thereof, and variable-motion connection-means associated with said mechanical drive connection on at least one side of said intermediate point for causing the effect of an elongating movement in said variable-motion connection-means during the periods of application of accelerative forces on said driven member.

3. A variable-ratio mechanical drive mechanism for transmitting power from a movable driving member to a movable driven member, comprising a rotatable flywheel-means mechanically coupled to said driving member for maintaining an angular velocity which does not greatly vary cyclically under the operating conditions of the mechanism, a rotatable flywheel-means mechanically coupled to said driven member for maintaining an angular velocity which does not greatly vary cyclically under the operating conditions of the mechanism, an intermediate movable member of appreciable mass, a mechanical drive connection for so connecting said driving member and said driven member that both of said flywheel-means may rotate at independently variable speeds and that an intermediate point in said mechanical drive connection is given a cyclically varying motion dependent, in some measure, upon the relative phase-positions of the driving and driven members, said mechanical drive connection being of such nature that it exerts both positive and negative cyclically varying force-reactions upon both the driving member and the driven member in dependence upon cyclically varying force-reactions which are imparted to said mechanical drive connection at said intermediate point, said mechanical drive connection including mechanical coupling means for imparting, to the center of inertia of said intermediate movable member, an irregular eccentric movement-component of continuous revolution about said intermediate point throughout the operation of said mechanism with a given direction of rotation of the driving-member flywheel, and variable-motion connection-means associated with said mechanical drive connection between said intermediate point and the driven member for causing the effect of an elongating movement in said variable-motion connection-means during the periods of application of accelerative forces on said driven member whereby the accelerative periods are lengthened and the decelerative periods are shortened.

4. A variable-ratio mechanical drive mechanism for transmitting power from a movable driving member to a movable driven member, comprising a rotatable flywheel-means mechanically coupled to said driving member for maintaining an angular velocity which does not greatly vary cyclically under the operating conditions of the mechanism, a rotatable flywheel-means mechanically coupled to said driven member for maintaining an angular velocity which does not greatly vary cyclically under the operating conditions of the mechanism, an intermediate movable member of appreciable mass, a mechanical drive connection for so connecting said driving member and said driven member that both of said flywheel-means may rotate at independently variable speeds and that an intermediate point in said mechanical drive connection is given a cyclically varying motion dependent, in some measure, upon the relative phase-positions of the driving and driven members, said mechanical drive connection being of such nature that it exerts both positive and negative cyclically varying force-reactions upon both the driving member and the driven member in dependence upon cyclically varying force-reactions which are imparted to said mechanical drive connection at said intermediate point, said mechanical drive connection including mechanical coupling means for causing the cyclically varying motion of said intermediate point to impart a cyclically reversing movement-component to said intermediate movable member, and variable-motion connection-means associated with said mechanical drive connection between said intermediate point and the driven member for causing the effect of an elongating movement in said variable-motion connection-means during the periods of application of accelerative forces on said driven member whereby the effectiveness of the accelerative periods is increased and the effectiveness of the decelerative periods is decreased.

5. A variable-ratio mechanical drive mechanism for transmitting power from a movable driving member to a movable driven member, comprising a rotatable flywheel-means mechanically coupled to said driving member for maintaining an angular velocity which does not greatly vary cyclically under the operating conditions of the mechanism, a rotatable flywheel-means mechanically coupled to said driven member for maintaining an angular velocity which does not greatly vary cyclically under the operating conditions of the mechanism, an intermediate movable member of appreciable mass, a mechanical drive connection for so connecting said driving member and said driven member that both of said flywheel-means may rotate at independently variable speeds and that an intermediate point in said mechanical drive connection is given a cyclically varying motion dependent, in some measure, upon the relative phase-positions of the driving and driven members, said mechanical drive connection being of such nature that it exerts both positive and negative cyclically varying force-reactions upon both the driving member and the driven member in dependence upon cyclically varying force-reactions which are imparted to said mechanical drive connection at said intermediate point, said mechanical drive connection including mechanical coupling means for utilizing the inertia of said intermediate movable member for imparting the cyclically varying force-reactions to said intermediate point as a result of the cyclically varying motion thereof, and yieldable connection-means associated with said mechanical drive connection for causing a yielding of said connection-means during the periods of application of accelerative forces whereby the effectiveness of the accelerative periods is increased and the effectiveness of the decelerative periods is decreased.

6. A variable-ratio mechanical drive mechanism for transmitting power from a movable driving member to a movable driven member, comprising a rotatable flywheel-means mechanically coupled to said driving member for maintaining an angular velocity which does not greatly vary cyclically under the operating conditions of the mechanism, a rotatable flywheel-means mechanically coupled to said driven member for maintaining an angular velocity which does not greatly vary cyclically under the operating conditions of the mechanism, an intermediate movable member of appreciable mass, a mechanical drive connection for so connecting said driving member and said driven member that both of said flywheel-means may rotate at independently variable speeds and that an intermediate point in said mechanical drive connection is given a cyclically varying motion dependent, in some measure, upon the relative phase-positions of the driving and driven members, said mechanical drive connection being of such nature that it exerts both positive and negative cyclically varying force-reactions upon both the driving member and the driven member in dependence upon cyclically varying force-reactions which are imparted to said mechanical drive connection at said intermediate point, said mechanical drive connection including mechanical coupling means for imparting, and developing force-reactions from, a back-and-forth movement-component of said intermediate movable member in a circular direction, and yieldable connection-means associated with said mechanical drive connection for causing the effect of an elongating movement in said variable-motion connection-means during the periods of application of accelerative forces.

7. A variable-ratio mechanical drive mechanism comprising a circular wheel mounted for rotation about an axis eccentric to said wheel, a crank-arm independently mounted for rotation about said axis, an annular member mounted for circular movement around the circular periphery of said wheel, a link-member connecting said crank-arm and said annular member, and a yieldable drive-connection associated with the rotation of said wheel about said eccentric axis.

8. A variable-ratio mechanical drive mechanism for transmitting power from a movable driving member to a movable driven member, comprising a rotatable flywheel-means mechanically coupled to said driving member for maintaining an angular velocity which does not greatly vary cyclically under the operating conditions of the mechanism, a rotatable flywheel-means mechanically coupled to said driven member for maintaining an angular velocity which does not greatly vary cyclically under the operating conditions of the mechanism, an intermediate movable member of appreciable mass, a mechanical drive connection for so connecting said driving member and said driven member that both of said flywheel-means may rotate at independently variable speeds and that an intermediate point in said mechanical drive connection is given a cyclically varying motion dependent, in some measure, upon the relative phase-positions of the driving and driven members, said mechanical drive connection being of such nature that it exerts both positive and negative cyclically varying force-reactions upon both the driving member and the driven member in dependence upon cyclically varying force-reactions which are imparted to said mechanical drive connection at said intermediate point, said mechanical drive connection including mechanical coupling means for imparting, and developing force-reactions from, two different movement-components of said intermediate movable member, one of said movement-components of said intermediate movable member being with respect to an effective center of inertia which is displaced from said intermediate point of the mechanical drive connection, said center of inertia of the intermediate movable member being given an irregular eccentric movement-component of continuous revolution about said intermediate point throughout the operation of the mechanism with a given direction of rotation of the driving-member flywheel, the other one of said movement-components of said intermediate movable member being a back-and-forth movement-component in a circular direction, and yieldable connection-means associated with said mechanical drive connection for causing a yielding of said connection-means during the periods of application of accelerative forces.

9. The invention as defined in claim 7, characterized by said annular member having most of its mass on one side thereof, in such phase-position as to produce an effective centrifugal driving-force tending predominantly to cause said wheel to rotate about its eccentric axis in a predetermined direction, when said crank-arm is rotating continuously in a single direction.

10. A polyphase variable-ratio mechanical drive mechanism for transmitting power from a movable driving member to a movable driven member, comprising a rotatable flywheel-means mechanically coupled to said driving member for maintaining an angular velocity which does not greatly vary cyclically under the operating conditions of the mechanism, a rotatable flywheel-means mechanically coupled to said driven member for maintaining an angular velocity which does not greatly vary cyclically under the operating conditions of the mechanism, a plurality of intermediate movable members of appreciable mass, and a plurality of polyphase-related mechanical drive connections; each mechanical drive connection so connecting said driving member and said driven member that both of said flywheel-means may rotate at independently variable speeds and that an intermediate point in said mechanical drive connection is given a cyclically varying motion dependent, in some measure, upon the relative phase-positions of the driving and driven members, each mechanical drive connection being of such nature that it exerts both positive and negative cyclically varying force-reactions upon both the driving member and the driven member in dependence upon cyclically varying force-reactions which are imparted to said mechanical drive connection at said intermediate point, each of a plurality of said mechanical drive connections including mechanical coupling means for utilizing the inertia of one of said intermediate movable members for imparting the cyclically varying force-reactions to said intermediate point in conformity with the cyclically varying motion thereof, and yieldable connection-means associated with each of a plurality of said mechanical drive connections for causing a yielding of said connection-means during the periods of application of accelerative forces on said driven member whereby the effectiveness of the accelerative periods is increased and the effectiveness of the decelerative periods is decreased.

11. A polyphase variable-ratio mechanical drive mechanism for transmitting power from a movable driving member to a movable driven member, comprising a rotatable flywheel-means mechanically coupled to said driving member for maintaining an angular velocity which does not greatly vary cyclically under the operating conditions of the mechanism, a rotatable flywheel-means mechanically coupled to said driven member for maintaining an angular velocity which does not greatly vary cyclically under the operating conditions of the mechanism, a plurality of intermediate movable members of appreciable mass, and a plurality of polyphase-related mechanical drive connections; each mechanical drive connection so connecting said driving member and said driven member that both of said flywheel-means may rotate at independently variable speeds and that an intermediate point in said mechanical drive connection is given a cyclically varying motion dependent, in some measure, upon the relative phase-positions of the driving and driven members, each mechanical drive connection being of such nature that it exerts both positive and negative cyclically varying force-reactions upon both the driving member and the driven member in dependence upon cyclically varying force-reactions which are imparted to said mechanical drive connection at said intermediate point, each of a plurality of said mechanical drive connections including mechanical coupling means for imparting, to the center of inertia of one of said intermediate movable members, an irregular eccentric movement-component of continuous revolution about said intermediate point throughout the operation of said mechanism with a given direction of rotation of the driving-member flywheel, and yieldable connection-means associated with each of a plurality of said mechanical drive connections for causing a yielding of said connection-means during the periods of application of accelerative forces on said driven member whereby the accelerative periods are lengthened and the decelerative periods are shortened.

12. A polyphase variable-ratio mechanical drive mechanism for transmitting power from a movable driving member to a movable driven member, comprising a rotatable flywheel-means mechanically coupled to said driving member for maintaining an angular velocity which does not greatly vary cyclically under the operating conditions of the mechanism, a rotatable flywheel-means mechanically coupled to said driven member for maintaining an angular velocity which does not greatly vary cyclically under the operating conditions of the mechanism, a plurality of intermediate movable members of appreciable mass, and a plurality of polyphase-related mechanical drive connections; each mechanical drive connection so connecting said driving member and said driven member that both of said flywheel-means may rotate at independently variable speeds and that an intermediate point in said mechanical drive connection is given a cyclically varying motion dependent, in some measure, upon the relative phase-positions of the driving and driven members, each mechanical drive connection being of such nature that it exerts both positive and negative cyclically varying force-reactions upon both the driving member and the driven member in dependence upon cyclically varying force-reactions which are imparted to said mechanical drive connection at said intermediate point, each of a plurality of said mechanical drive connections including mechanical coupling means for causing the cyclically varying motion of said intermediate point to impart a cyclically reversing movement-component to one of said intermediate movable members, and resilient connection-means associated with each of a plurality of said mechanical drive connections for causing a yielding of said connection-means whereby the accelerative periods are made more effective and the decelerative periods are made less effective.

13. A polyphase variable-ratio mechanical drive mechanism for transmitting power from a movable driving member to a movable driven member, comprising a rotatable flywheel-means mechanically coupled to said driving member for maintaining an angular velocity which does not greatly vary cyclically under the operating conditions of the mechanism, a rotatable flywheel-means mechanically coupled to said driven member for maintaining an angular velocity which does not greatly vary cyclically under the operating conditions of the mechanism, a plurality of intermediate movable members of appreciable mass, and a plurality of mechanical drive connections including a plurality of polyphase-related mechanical drive connections each so connecting said driving member and said driven member that both of said flywheel-means may rotate at independently variable speeds and that an intermediate point in said mechanical drive connection is given a cyclically varying motion dependent, in some measure, upon the relative phase-positions of the driving and driven members, each of the aforesaid mechanical drive connections being of such nature that it exerts both positive and negative cyclically varying force-reactions upon both the driving member and the driven member in dependence upon cyclically varying force-reactions which are imparted to said mechanical drive connections at said intermediate point; said mechanical drive connections including a plurality of polyphase-related mechanisms each including mechanical coupling means for imparting, to the center of inertia of one of said intermediate movable members, an irregular eccentric movement-component of continuous revolution about said intermediate point throughout the operation of said mechanism with a given direction of rotation of the driving-member flywheel; said mechanical drive connections including a plurality of polyphase-related mechanisms each including mechanical coupling means for causing the cyclically varying motion of its intermediate point to impart a cyclically reversing movement-component to one of said intermediate movable members; and yieldable connection-means associated with a plurality of said mechanical drive connections for causing a yielding of said connection-means during the periods of application of accelerative forces whereby the accelerative periods are made more effective and the decelerative periods are made less effective.

14. A polyphase variable-ratio mechanical drive mechanism for transmitting power from a movable driving member to a movable driven member, comprising a rotatable flywheel-means mechanically coupled to said driving member for maintaining an angular velocity which does not greatly vary cyclically under the operating conditions of the mechanism, a rotatable flywheel-means mechanically coupled to said driven member for maintaining an angular velocity which does not greatly vary cyclically under the operating conditions of the mechanism, a plurality of intermediate movable members of appreciable mass, and a plurality of polyphase-related mechanical drive connections; each mechanical drive connection so connecting said driving member and said driven member that both of said flywheel-means may rotate at independently variable speeds and that an intermediate point in said mechanical drive connection is given a cyclically varying motion dependent, in some measure, upon the relative phase-positions of the driving and driven members, each mechanical drive connection being of such nature that it exerts both positive and negative cyclically varying force-reactions upon both the driving member and the driven member in dependence upon cyclically varying force-reactions which are imparted to said mechanical drive connection at said intermediate point, each of a plurality of said mechanical drive connections including mechanical coupling means for imparting, and developing force-reactions from, two different movement-components of one of said intermediate movable members, one of said movement-components of each intermediate movable member being with respect to an effective center of inertia which is displaced from the intermediate point of the associated mechanical drive connection, said center of inertia of the intermediate movable member being given an irregular eccentric movement-component of continuous revolution about said intermediate point throughout the operation of the mechanism with a given direction of rotation of the driving-member flywheel, the other one of said movement-components of each intermediate movable member being a back-and-forth movement-component in a circular direction, and yieldable connection-means associated with each of said mechanical drive connections for causing a yielding of said connection-means during the periods of application of accelerative forces.

15. A polyphase variable-ratio mechanical drive mechanism for transmitting driving-torques between two independently rotatable co-axial shafts, comprising the combination, with said shafts, of a large cylindrical tubular member connected to one of said shafts, the second shaft having an inwardly extending portion within said large tubular member and being journaled therein, a plurality of polyphase-related circular wheels severally mounted for eccentric rotation on said inwardly extending portion of said second shaft at spaced points therealong, a separate yieldable drive-connection alongside of each of a plurality of said wheels for effecting a torque-transmitting connection between the second shaft and the respective wheels, an annular member mounted for circular movement around the circular periphery of each one of said wheels, and a plurality of polyphase-related link-members for connecting various points within the cylindrical shell of the tubular member to the respective annular members.

16. The invention as defined in claim 15, characterized by each of said annular members having most of its mass on one side thereof, in such phase-position as to produce an effective centrifugal driving-force tending predominantly to cause its associated wheel to rotate about said second shaft in a predetermined direction, when said tubular member is rotating continuously in a single direction.

17. A variable-ratio mechanical drive mechanism for transmitting variable torque from a driving shaft to a driven shaft, comprising mechanical drive-connection means for so coupling the two shafts as to transmit a resultant positive driving torque which is relatively large when the driving shaft is rotating and the driven shaft is stationary, and which decreases as the speed of the driven shaft approaches that of the driving shaft, said mechanical drive-connection means also at the same time so coupling the two shafts as to transmit a resultant positive driving torque which is relatively small when the driving shaft is rotating and the driven shaft is stationary, and which increases as the speed of the driven shaft approaches that of the driving shaft, said mechanical drive-connection means transmitting both positive and negative force-reactions and including yieldable torque-transmitting means.

18. A variable-ratio mechanical drive mechanism for transmitting variable torque from a driving shaft to a coaxial driven shaft, comprising a rotatable flywheel-means mechanically coupled to said driving shaft for maintaining an angular velocity which does not greatly vary cyclically under the operating conditions of the mechanism, a rotatable flywheel-means mechanically coupled to said driven shaft for maintaining an angular velocity which does not greatly vary cyclically under the operating conditions of the mechanism, and a mechanical drive connection comprising an oscillatory point with some freedom of oscillatory movement about the common axis independently of both shafts, a bell-crank lever journaled, at an intermediate point thereof, at said oscillatory point, said bell-crank lever having a long arm and a short arm, said short arm being shorter than the radius of said oscillatory point, a centrifugal mass having a center of inertia near the long end of said bell-crank lever, mechanical coupling means for transmitting both positive and negative torques from the short end of said bell-crank lever to said driven shaft, and mechanical coupling means for transmitting both positive and negative torques from said driving shaft to the long arm of said bell-crank lever in such manner as to impart, to said centrifugal mass, an irregular eccentric movement-component of continuous revolution about said oscillatory point throughout the rotation of the driving shaft in a given direction of rotation.

19. A variable-ratio mechanical drive mechanism for transmitting variable torque from a driving shaft to a coaxial driven shaft, comprising a rotatable flywheel-means mechanically coupled to said driving shaft for maintaining an angular velocity which does not greatly vary cyclically under the operating conditions of the mechanism, a rotatable flywheel-means mechanically coupled to said driven shaft for maintaining an angular velocity which does not greatly vary cyclically under the operating conditions of the mechanism, and a mechanical drive connection comprising an oscillatory point with some freedom of oscillatory movement about the common axis independently of both shafts, a centrifugal mass, means for mounting said centrifugal mass with freedom of revolution about said oscillatory point so as to exercise centrifugal force on said point, mechanical coupling means for transmitting both positive and negative torques from said driving shaft to said centrifugal mass in such manner as to impart, to the latter, an irregular eccentric movement-component of continuous revolution about said oscillatory point throughout the rotation of the driving shaft in a given direction of rotation, and resilient connection-means between said oscillatory point and said driven shaft.

20. A variable-ratio mechanical drive mechanism for transmitting power from a movable driving member to a movable driven member, comprising a rotatable flywheel-means mechanically coupled to said driving member for maintaining an angular velocity which does not greatly vary cyclically under the operating conditions of the mechanism, a rotatable flywheel-means mechanically coupled to said driven member for maintaining an angular velocity which does not greatly vary cyclically under the operating conditions of the mechanism, an intermediate movable member of appreciable mass, a mechanical drive connection for so connecting said driving member and said driven member that both of said flywheel-means may rotate at independently variable speeds and that an intermediate point in said mechanical drive connection is given a cyclically varying motion dependent, in some measure, upon the relative phase-positions of the driving and driven members, said mechanical drive connection being of such nature that it exerts both positive and negative cyclically varying force-reactions upon both the driving member and the driven member in dependence upon cyclically varying force-reactions which are imparted to said mechanical drive connection at said intermediate point, said mechanical drive connection including mechanical coupling means associated with said intermediate movable member for imparting, to said intermediate point, cyclically varying force-reactions as a result of the cyclically varying motion thereof, and connection-means associated with said mechanical drive connection for causing the effect of an elongating movement in said connection during the periods of application of accelerative forces on said driven member.

21. A variable-ratio mechanical drive mechanism for transmitting variable torque from a driving shaft to a coaxial driven shaft, comprising a rotatable flywheel-means mechanically coupled to said driving shaft for maintaining an angular velocity which does not greatly vary cyclically under the operating conditions of the mechanism, a rotatable flywheel-means mechanically coupled to said driven shaft for maintaining an angular velocity which does not greatly vary cyclically under the operating conditions of the mechanism, and a mechanical drive connection comprising an oscillatory point with some freedom of oscillatory movement about the common axis independently of both shafts, mechanical coupling means including resilient means for transmitting both clockwise and counterclockwise turning-moments from said driving shaft to said oscillatory point, and from said oscillatory point to said driven shaft, the freedom of movement of said oscillatory point and the deformability of the resilient means being such that the driving shaft can rotate faster than the driven shaft while transmitting a preponderance of torque in the direction of rotation of the driving shaft.

22. A variable-ratio mechanical drive mechanism for transmitting variable torque from a driving end-member of the mechanism to a driven end-member of the mechanism, said mechanism comprising an epicyclic train including a planetary wheel, a sun wheel, and means for constraining the planetary wheel to have a motion compounded of rotation about its own axis and revolution of its axis about the axis of the sun wheel, an inertia mass mounted for movement with an oscillatory component, two planetary-wheel transmitting means associated with said planetary wheel, the first planetary-wheel transmitting means responding to the revolution of the planetary-wheel axis about the sun-wheel axis, and the second planetary-wheel transmitting means responding to the movement of a rotating point on the planetary wheel, a first mechanical coupling means for transmitting both positive and negative torques between one of said planetary-wheel transmitting means and said inertia mass, a second mechanical coupling means for transmitting both positive and negative torques between the other of said planetary-wheel transmitting means and one of the end-members of the mechanism, and a third mechanical coupling means for transmitting both positive and negative torques between the sun wheel and the other one of the end-members of the mechanism, at least one of said two last-mentioned mechanical coupling means including a yieldable connection.

23. A variable-ratio mechanical drive mechanism for transmitting variable torque from a driving end-member of the mechanism to a driven end member of the mechanism, said mechanism comprising an epicylic train including a planetary wheel, a sun wheel, and means for constraining the planetary wheel to have a motion compounded of rotation about its own axis and revolution of its axis about the axis of the sun wheel, an inertia means mounted for movement having an oscillatory component, two planetary-wheel transmitting means associated with said planetary wheel, the first planetary-wheel transmitting means responding to the revolution of the planetary-wheel axis about the sun-wheel axis, and the second planetary-wheel transmitting means responding to the movement of a rotating point on the planetary wheel, a first mechanical coupling means for transmitting both positive and negative torques between said second planetary-wheel transmitting means and said inertia mass, a second mechanical coupling means for transmitting both positive and negative torques between said first planetary-wheel transmitting means and one of the end-members of the mechanism, and a third mechanical coupling means for transmitting both positive and negative torques between the sun wheel and the other one of the end-members of the mechanism, at least one of said three mechanical coupling means including a resilient connection.

24. A variable-ratio mechanical drive mechanism comprising a circular wheel mounted for rotation about an axis eccentric to said wheel, a crank-arm independently mounted for rotation about said axis, a weight-member mounted for circular movement substantially concentrically with respect to said wheel, a link-member connecting said crank-arm and said weight-member, and a yieldable drive-connection associated with the rotation of said wheel about said eccentric axis.

25. The invention as defined in claim 24, characterized by said weight-member having most of its mass on one side thereof, in such phase-position as to produce an effective centrifugal driving-force tending predominantly to cause said wheel to rotate about its eccentric axis in a predetermined direction, when said crank-arm is rotating continuously in a single direction.

26. A polyphase variable-ratio mechanical drive mechanism for transmitting driving-torques between two independently rotatable coaxial shafts, comprising the combination, with said shafts, of a large cylindrical tubular member connected to one of said shafts, the second shaft having an inwardly extending portion within said large tubular member and being journaled therein, a plurality of polyphase-related circular wheels severally mounted for eccentric rotation on said inwardly extending portion of said second shaft at spaced points therealong, a separate yieldable drive-connection alongside of each of a plurality of said wheels for effecting a torque-transmitting connection between the second shaft and the respective wheels, a weight-member mounted for circular movement substantially concentrically with respect to each one of said wheels, and a plurality of polyphase-related link-members for connecting various points within the cylindrical shell of the tubular member to the respective weight-members.

27. The invention as defined in claim 26, characterized by each of said weight-members having most of its mass on one side thereof, in such phase-position as to produce an effective centrifugal driving-force tending predominantly to cause its associated wheel to rotate about said second shaft in a predetermined direction, when said tubular member is rotating continuously in a single direction.

JULIUS J. TOROK.